United States Patent
Alizadeh-Shabdiz et al.

(10) Patent No.: US 8,909,245 B2
(45) Date of Patent: *Dec. 9, 2014

(54) SYSTEM AND METHOD FOR ESTIMATING POSITIONING ERROR WITHIN A WLAN-BASED POSITIONING SYSTEM

(75) Inventors: Farshid Alizadeh-Shabdiz, Wayland, MA (US); Edward James Morgan, Needham, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,028

(22) Filed: Aug. 9, 2011

(65) Prior Publication Data

US 2011/0287783 A1 Nov. 24, 2011

Related U.S. Application Data

(63) Continuation of application No. 12/966,001, filed on Dec. 13, 2010, now Pat. No. 8,019,357, which is a continuation of application No. 11/625,450, filed on Jan. 22, 2007, now Pat. No. 7,856,234.

(60) Provisional application No. 60/864,716, filed on Nov. 7, 2006.

(51) Int. Cl.
*H04W 64/00* (2009.01)
*G01S 5/02* (2010.01)
*G01S 19/48* (2010.01)
*G01S 11/02* (2010.01)

(52) U.S. Cl.
CPC . *G01S 5/021* (2013.01); *G01S 5/02* (2013.01); *G01S 19/48* (2013.01); *H04W 64/00* (2013.01); *G01S 11/02* (2013.01)
USPC ............ 455/456.1; 455/404.2; 455/41.2; 455/420; 455/436; 455/561; 370/328; 370/329; 370/331; 370/338

(58) Field of Classification Search
CPC .................. H04W 36/0088; H04W 36/0094; H04W 88/06; H04W 88/085; H04W 88/10; H04W 92/24; H04W 64/03
USPC ............ 455/456.1–457, 435.1–453; 370/328, 370/329, 338, 385, 420
See application file for complete search history.

(56) References Cited

U.S. PATENT DOCUMENTS

| 4,991,176 A | 2/1991 | Dahbura et al. |
| 6,052,598 A | 4/2000 | Rudrapatna et al. |

(Continued)

FOREIGN PATENT DOCUMENTS

| EP | 1612999 A1 | 1/2006 |
| EP | 1655619 A1 | 5/2006 |

(Continued)

OTHER PUBLICATIONS

Chan, et al., "Collaborative Localization: Enhancing WiFi-Based Position Estimation with Neighborhood Links in Clusters," May 2006, 18 pages.

(Continued)

*Primary Examiner* — Babar Sarwar
(74) *Attorney, Agent, or Firm* — Cesari and McKenna, LLP

(57) ABSTRACT

The invention features a method of estimating an expected error of a position estimate for use in a WLAN positioning system that estimates the position of a WLAN-enabled device. The WLAN-enabled device receives signals transmitted by a WLAN access point in range of the WLAN-enabled device. The method estimates the position of the WLAN-enabled device based on the received signals from the WLAN access point in range of the WLAN enabled device. The method also estimates an expected error of the position estimate based on characteristics of the WLAN access point in range of the WLAN enabled device, wherein the expected error predicts a relative accuracy of the position estimate.

42 Claims, 4 Drawing Sheets

(56) References Cited

U.S. PATENT DOCUMENTS

| | | | |
|---|---|---|---|
| 6,184,829 B1 | 2/2001 | Stilp | |
| 6,249,252 B1 | 6/2001 | Dupray | |
| 6,272,405 B1 | 8/2001 | Kubota et al. | |
| 6,317,604 B1 | 11/2001 | Kovach, Jr. et al. | |
| 6,377,209 B1 | 4/2002 | Krasner | |
| 6,414,635 B1 | 7/2002 | Stewart et al. | |
| 6,420,999 B1 | 7/2002 | Vayanos | |
| 6,421,330 B1 | 7/2002 | Chung et al. | |
| 6,463,290 B1 | 10/2002 | Stilp et al. | |
| 6,473,038 B2 | 10/2002 | Patwari et al. | |
| 6,674,403 B2 | 1/2004 | Gray et al. | |
| 6,678,611 B2 | 1/2004 | Khavakh et al. | |
| 6,684,250 B2 | 1/2004 | Anderson et al. | |
| 6,725,158 B1 | 4/2004 | Sullivan et al. | |
| 6,748,324 B2 | 6/2004 | Patwari et al. | |
| 6,799,047 B1 | 9/2004 | Bahl et al. | |
| 6,801,778 B2 | 10/2004 | Korrapaty et al. | |
| 6,816,111 B2 | 11/2004 | Krasner | |
| 6,845,239 B1 * | 1/2005 | Sato et al. | 455/456.1 |
| 6,853,847 B2 | 2/2005 | Shioda et al. | |
| 6,873,290 B2 | 3/2005 | Anderson et al. | |
| 6,888,811 B2 | 5/2005 | Eaton et al. | |
| 6,915,128 B1 | 7/2005 | Oh | |
| 6,919,842 B2 | 7/2005 | Cho | |
| 6,934,626 B2 | 8/2005 | Tingly | |
| 6,968,194 B2 | 11/2005 | Aljadeff et al. | |
| 6,978,023 B2 | 12/2005 | Dacosta | |
| 6,995,708 B2 | 2/2006 | Schmidt | |
| 7,002,943 B2 | 2/2006 | Bhagwat et al. | |
| 7,019,753 B2 | 3/2006 | Rappaport et al. | |
| 7,053,830 B2 | 5/2006 | Krumm et al. | |
| 7,092,943 B2 | 8/2006 | Roese et al. | |
| 7,110,779 B2 | 9/2006 | Billhartz et al. | |
| 7,116,988 B2 | 10/2006 | Dietrich et al. | |
| 7,123,928 B2 | 10/2006 | Moeglein et al. | |
| 7,130,646 B2 | 10/2006 | Wang | |
| 7,133,909 B2 | 11/2006 | Bahl | |
| 7,138,946 B2 | 11/2006 | Tamaki et al. | |
| 7,139,225 B2 | 11/2006 | Farmer | |
| 7,167,715 B2 | 1/2007 | Stanforth | |
| 7,167,716 B2 | 1/2007 | Kim et al. | |
| 7,171,217 B2 | 1/2007 | Beuck | |
| 7,187,925 B2 | 3/2007 | Abhishek et al. | |
| 7,206,294 B2 | 4/2007 | Garahi et al. | |
| 7,212,828 B2 | 5/2007 | Hind et al | |
| 7,212,830 B2 | 5/2007 | Tamaki et | |
| 7,236,799 B2 | 6/2007 | Wilson et al. | |
| 7,250,907 B2 | 7/2007 | Krumm et al. | |
| 7,257,411 B2 | 8/2007 | Gwen et al. | |
| 7,271,765 B2 | 9/2007 | Stilp et al. | |
| 7,295,556 B2 | 11/2007 | Roese et al. | |
| 7,305,245 B2 | 12/2007 | Alizadeh-Shabdiz et al. | |
| 7,308,276 B2 | 12/2007 | Goren et al. | |
| 7,313,402 B1 | 12/2007 | Rahman | |
| 7,313,403 B2 | 12/2007 | Gong et al. | |
| 7,315,281 B2 | 1/2008 | Dejanovic et al. | |
| 7,323,991 B1 | 1/2008 | Eckert et al. | |
| 7,330,726 B2 | 2/2008 | Vare et al. | |
| 7,359,718 B2 | 4/2008 | Tao et al. | |
| 7,397,424 B2 | 7/2008 | Houri | |
| 7,400,598 B1 | 7/2008 | Humphries et al. | |
| 7,403,762 B2 | 7/2008 | Morgan et al. | |
| 7,412,246 B2 | 8/2008 | Lewis et al. | |
| 7,414,988 B2 | 8/2008 | Jones et al. | |
| 7,417,971 B2 | 8/2008 | Jeong et al. | |
| 7,433,673 B1 | 10/2008 | Everson et al. | |
| 7,433,694 B2 | 10/2008 | Morgan et al. | |
| 7,433,696 B2 | 10/2008 | Dietrich et al. | |
| 7,437,444 B2 | 10/2008 | Houri | |
| 7,466,986 B2 | 12/2008 | Halcrow et al. | |
| 7,471,954 B2 | 12/2008 | Brachet et al. | |
| 7,474,646 B2 | 1/2009 | Tamaki | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,503,489 B2 | 3/2009 | Heffez et al. | |
| 7,509,131 B2 | 3/2009 | Krumm et al. | |
| 7,511,662 B2 | 3/2009 | Mathews et al. | |
| 7,515,578 B2 | 4/2009 | Alizadeh-Shabdiz et al. | |
| 7,519,470 B2 | 4/2009 | Brasche et al. | |
| 7,522,049 B2 | 4/2009 | Aljadeff et al. | |
| 7,525,484 B2 | 4/2009 | Dupray et al. | |
| 7,551,579 B2 | 6/2009 | Alizadeh-Shabdiz et al. | |
| 7,551,929 B2 | 6/2009 | Alizadeh-Shabdiz et al. | |
| 7,576,694 B2 | 8/2009 | Anjum et al. | |
| 7,603,128 B1 | 10/2009 | Jones et al. | |
| 7,603,710 B2 | 10/2009 | Harvey et al. | |
| 7,620,404 B2 | 11/2009 | Chesnais et al. | |
| 7,623,871 B2 | 11/2009 | Sheynblat | |
| 7,634,266 B2 | 12/2009 | McDougall et al. | |
| 7,647,055 B2 | 1/2010 | Gum et al. | |
| 7,685,279 B2 | 3/2010 | Miltonberger et al. | |
| 7,706,356 B1 | 4/2010 | Olshansky et al. | |
| 7,706,975 B2 | 4/2010 | Farmer et al. | |
| 7,751,828 B2 | 7/2010 | Kim et al. | |
| 7,751,829 B2 | 7/2010 | Masuoka et al. | |
| 7,764,231 B1 | 7/2010 | Karr et al. | |
| 7,768,963 B2 | 8/2010 | Alizadeh-Shabdiz | |
| 7,769,396 B2 | 8/2010 | Alizadeh-Shabdiz et al. | |
| 7,818,017 B2 | 10/2010 | Alizadeh-Shabdiz et al. | |
| 7,835,754 B2 | 11/2010 | Alizadeh-Shabdiz et al. | |
| 7,853,250 B2 | 12/2010 | Harvey et al. | |
| 7,856,234 B2 | 12/2010 | Alizadeh-Shabdiz et al. | |
| 7,899,006 B2 | 3/2011 | Boyd | |
| 7,916,661 B2 | 3/2011 | Alizadeh-Shabdiz et al. | |
| 8,026,847 B2 | 9/2011 | Pon | |
| 8,032,156 B2 | 10/2011 | Khushu | |
| 8,060,389 B2 | 11/2011 | Johnson | |
| 8,077,084 B2 | 12/2011 | Syrjarinne et al. | |
| 8,099,104 B2 | 1/2012 | Loushine | |
| 8,260,322 B2 | 9/2012 | Allen et al. | |
| 8,289,206 B2 | 10/2012 | Wigren et al. | |
| 8,364,148 B2 | 1/2013 | Dravida et al. | |
| 8,364,746 B2 | 1/2013 | Annamalai et al. | |
| 2001/0030625 A1 | 10/2001 | Doles et al. | |
| 2002/0108371 A1 | 8/2002 | Rouse et al. | |
| 2003/0054830 A1 | 3/2003 | Williams et al. | |
| 2003/0118015 A1 | 6/2003 | Gunnarsson et al. | |
| 2003/0125045 A1 | 7/2003 | Riley et al. | |
| 2003/0188016 A1 | 10/2003 | Agarwalla et al. | |
| 2003/0218570 A1 | 11/2003 | Moore et al. | |
| 2003/0220116 A1 | 11/2003 | Sagefalk et al. | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0049570 A1 | 3/2004 | Frank et al. | |
| 2004/0057408 A1 | 3/2004 | Gray | |
| 2004/0081133 A1 | 4/2004 | Smavatkul et al. | |
| 2004/0087317 A1 | 5/2004 | Caci | |
| 2004/0166864 A1 | 8/2004 | Hill et al. | |
| 2004/0203420 A1 | 10/2004 | Rick et al. | |
| 2004/0203880 A1 | 10/2004 | Riley | |
| 2004/0203904 A1 | 10/2004 | Gwon et al. | |
| 2004/0203910 A1 | 10/2004 | Hind et al. | |
| 2004/0203926 A1 | 10/2004 | Ruutu et al. | |
| 2004/0205234 A1 | 10/2004 | Barrack et al. | |
| 2004/0248589 A1 | 12/2004 | Gwon et al. | |
| 2005/0003827 A1 | 1/2005 | Whelan | |
| 2005/0020266 A1 | 1/2005 | Backes et al. | |
| 2005/0037775 A1 | 2/2005 | Moeglein et al. | |
| 2005/0073980 A1 | 4/2005 | Thomson et al. | |
| 2005/0085257 A1 | 4/2005 | Laird et al. | |
| 2005/0090268 A1 | 4/2005 | Yamasaki et al. | |
| 2005/0107953 A1 | 5/2005 | Sugla | |
| 2005/0108306 A1 | 5/2005 | Martizano Catalasan | |
| 2005/0181804 A1 | 8/2005 | Misikangas et al. | |
| 2005/0186967 A1 | 8/2005 | Ozluturk | |
| 2005/0192024 A1 | 9/2005 | Sheynblat | |
| 2005/0208919 A1 | 9/2005 | Walker et al. | |
| 2005/0215201 A1 | 9/2005 | Cao et al. | |
| 2005/0246334 A1 | 11/2005 | Tao et al. | |
| 2005/0270236 A1 | 12/2005 | Krumm et al. | |
| 2006/0009235 A1 | 1/2006 | Sheynblat et al. | |
| 2006/0025153 A1 | 2/2006 | Inaba | |

(56) References Cited

U.S. PATENT DOCUMENTS

| | | |
|---|---|---|
| 2006/0046709 A1 | 3/2006 | Krumm et al. |
| 2006/0072502 A1 | 4/2006 | Crandall et al. |
| 2006/0078122 A1 | 4/2006 | Dacosta |
| 2006/0089157 A1 | 4/2006 | Casey et al. |
| 2006/0095348 A1 | 5/2006 | Jones et al. |
| 2006/0095349 A1 | 5/2006 | Morqan et al. |
| 2006/0106850 A1 | 5/2006 | Morqan et al. |
| 2006/0170591 A1 | 8/2006 | Houri |
| 2006/0197704 A1 | 9/2006 | Luzzatto et al. |
| 2006/0200843 A1 | 9/2006 | Moroan et al. |
| 2006/0217131 A1 | 9/2006 | Alizadeh-Shabdiz et al. |
| 2006/0221918 A1 | 10/2006 | Wang |
| 2006/0227739 A1 | 10/2006 | Mahany et al. |
| 2006/0229088 A1 | 10/2006 | Walter |
| 2006/0240840 A1 | 10/2006 | Morqan et al. |
| 2006/0240846 A1 | 10/2006 | Bhattacharya et al. |
| 2006/0271517 A1 | 11/2006 | Deloach, Jr. |
| 2007/0002813 A1 | 1/2007 | Tenny et al. |
| 2007/0004428 A1 | 1/2007 | Morgan et al. |
| 2007/0018891 A1 | 1/2007 | Golden et al. |
| 2007/0077968 A1 | 4/2007 | Kuzminskiy |
| 2007/0097511 A1 | 5/2007 | Das et al. |
| 2007/0121560 A1 | 5/2007 | Edge |
| 2007/0126635 A1 | 6/2007 | Houri |
| 2007/0139269 A1 | 6/2007 | Chen et al. |
| 2007/0150516 A1 | 6/2007 | Morgan et al. |
| 2007/0167174 A1 | 7/2007 | Halcrow et al. |
| 2007/0202888 A1 | 8/2007 | Brachet et al. |
| 2007/0210938 A1 | 9/2007 | Duerwaarder et al. |
| 2007/0232892 A1 | 10/2007 | Alizadeh-Shabdiz et al. |
| 2007/0249366 A1 | 10/2007 | Thomson et al. |
| 2007/0258408 A1 | 11/2007 | Alizadeh-Shabdiz et al. |
| 2007/0258409 A1 | 11/2007 | Alizadeh-Shabdiz et al. |
| 2007/0258420 A1 | 11/2007 | Alizadeh-Shabdiz et al. |
| 2007/0258421 A1 | 11/2007 | Alizadeh-Shabdiz et al. |
| 2007/0259624 A1 | 11/2007 | Alizadeh-Shabdiz et al. |
| 2007/0280152 A1 | 12/2007 | Thomson et al. |
| 2007/0280182 A1 | 12/2007 | Wisherd et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0039115 A1 | 2/2008 | Hauzli et al. |
| 2008/0108319 A1 | 5/2008 | Gallagher |
| 2008/0108371 A1 | 5/2008 | Alizadeh-Shabdiz et al. |
| 2008/0132170 A1 | 6/2008 | Alizadeh-Shabdiz et al. |
| 2008/0133762 A1 | 6/2008 | Edge et al. |
| 2008/0139217 A1 | 6/2008 | Alizadeh-Shabdiz et al. |
| 2008/0176583 A1 | 7/2008 | Brachet et al. |
| 2008/0227465 A1 | 9/2008 | Wachter et al. |
| 2008/0242305 A1 | 10/2008 | Kahlert et al. |
| 2008/0248741 A1 | 10/2008 | Alizadeh-Shabdiz |
| 2008/0248808 A1 | 10/2008 | Alizadeh-Shabdiz |
| 2009/0011779 A1 | 1/2009 | MacNaughtan et al. |
| 2009/0075672 A1 | 3/2009 | Jones et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0213828 A1 | 8/2009 | Brundage et al. |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0298659 A1 | 12/2011 | Alizadeh-Shabdiz |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0115508 A1* | 5/2012 | Moeglein et al. .......... 455/456.1 |

FOREIGN PATENT DOCUMENTS

| | | |
|---|---|---|
| EP | 1850606 A1 | 10/2007 |
| EP | 2427004 | 3/2012 |
| JP | 09-074585 | 3/1997 |
| JP | 2002-057614 | 2/2002 |
| JP | 2003-329757 | 11/2003 |
| JP | 2004-112482 | 4/2004 |
| WO | WO-02/17567 A3 | 2/2002 |
| WO | WO-03/102620 A1 | 12/2003 |
| WO | WO-2004/016032 | 2/2004 |
| WO | WO-2004/036240 | 4/2004 |
| WO | WO-2005/088991 A1 | 9/2005 |
| WO | WO-2005/121829 A1 | 12/2005 |
| WO | WO-2006/070211 A1 | 7/2006 |
| WO | WO-2006/110181 | 10/2006 |
| WO | WO-2006/117587 A1 | 11/2006 |
| WO | WO-2007/109880 A1 | 10/2007 |
| WO | WO-2007/133967 | 11/2007 |
| WO | WO-2007/133968 | 11/2007 |
| WO | WO-2008/057737 | 5/2008 |
| WO | WO-2011/011201 | 1/2011 |

OTHER PUBLICATIONS

European Search Report and Written Opinion for EP07783288, dated Jun. 3, 2010, 7 pages.
Griswold et al., "ActiveCampus—Sustaining Educational Communities through Mobile Technology." UCSD CSE Technical Report #CS200-0714, 2002, 19 pages.
Hazas, M., et al., "Location-Aware Computing Comes of Age," IEEE, vol. 37, Feb. 2004.
Hellerbrandt, M., et al., "Estimating Position and Velocity of Mobile in a Cellular adio Network," IEEE Transactions on Vehicular Technology, vol. 46, No. 1, Feb. 1997.
Hightower, et al., "Particle Filters for Location Estimation in Ubiquitous Computing: A Case Study," Sep. 2004, 18 pages.
International Search Report and Written Opinion of the International Searching Authority, the United States Patent and Trademark Office, for International Application No. PCT/US2007/068248, mailing date of Aug. 6, 2008, 4 pages.
International Search Report and Written Opinion of the International Searching Authority, the United States Patent and Trademark Office, for International Application No. PCT/US2007/068251, mailing date of Aug. 25, 2008, 6 pages.
International Search Report and Written Opinion of the International Searching Authority, the United States Patent and Trademark Office, for International Application No. PCT/US2010/041279, mailing date of Sep. 1, 2010, 7 pages.
International Search Report, International Application No. PCT/US05/39208, mailed Jan. 29, 2008, 3 pages.
International Search Report, International Patent Application No. PCT/US07/81929, mailed Apr. 16, 2008 (2 pages).

(56) References Cited

OTHER PUBLICATIONS

Kim, M., et al., "Risks of using AP locations discovered through war driving,"; Pervasive Computing; May 19, 2006; p. 67-81.
Kirsner, S., "One more way to find yourself," The Boston Globe, May 23, 2005, Retrieved from www.boston.com.
Krumm, J., et al., "LOCADIO: Inferring Motion and Location from Wi-Fi Signal Strengths," First Annual International Conference on Mobile and Ubiquitous Systems: Networking and Services, Aug. 2004.
LaMarca, A., et al., "Place Lab: Device Positioning Using Radio Beacons in the Wild,"; Pervasive Computing; Oct. 2004; p. 116-133, 18 pages.
Muthukrishnan, K., et al., "Towards Smart Surroundings: Enabling Techniques and Technologies for Localization," Lecture Notes in Computer Science, vol. 3479, May 2005, 11 pages.
Supplementary European Search Report and Written Opinion for EP07761894, dated Jun. 3, 2010, 8 pages.
Supplementary European Search Report and Written Opinion for EP07868513, dated Jun. 7, 2010, 5 pages.
European Search Report for Application No. 11190959 dated Jan. 23, 2012, 2 pages.
Algorithms, "Eulerian Cycle/Chinese Postman," http://www.2.toki.or.id/bookl AlqDesignManual/BOOKIBOOK4/NODE165.HTM, Jun. 2, 1997, pp. 1-4.
"Delta Encoding", Wikipedia, retrieved from http://en.wikipedia.org/wiki/Delta_encoding, Mar. 2006, pp. 1-5.
"Huffman Coding", Wikipedia, retrieved from http://en.wikipedia.org/wiki/Huffman_coding, Mar. 2006, pp. 1-10.
Kawabata, K., "Estimating Velocity Using Diversity Reception," IEEE, Mar. 1994, pp. 371-374.
Kwan, M. "Graphic Programming Using Odd or Even Points," Chinese Math. 1, 1962, pp. 273-277.
*Skyhook Wireless, Inc. v. Google, Inc.*, Complaint filed with Jury Demand against Google Inc.—Magistrate Consent Notice to Pltf.— filed by Skyhook Wireless Inc. (with 11 Exhibits) filed in the United States District Court of Delaware, Case No. 1:2012-cv-01177-RGA, on Sep. 20, 2012, pp. 1-196.
*Skyhook Wireless, Inc. v. Google, Inc.*, Report to the Commissioner of Patents and Trademarks for Patent-Trademark Nos. 7,856,234; 8,019,357; 8,022,877; 8,154,454; 8,223,074; 8,242,960; 8,229,455; 8,054,219; 7,471,954 filed in the United States District Court of Delaware, Case No. 1:2012-cv-01177-RGA, on Sep. 20, 2012, pp. 1.
*Skyhook Wireless, Inc. v. Google, Inc.*, Summons Returned Executed by Skyhook Wireless Inc., Google Inc. served on Sep. 20, 2012 and filed in the United States District Court of Delaware, Case No. 1:2012-cv-01177-RGA, on Sep. 21, 2012, pp. 1-2.
*Skyhook Wireless, Inc. v. Google, Inc.*, Motion to Transfer Case to the United States District Court for the District of Massachusetts, filed by Google Inc. and filed in the United States District Court of Delaware, Case No. 1:2012-cv-01177-RGA, on Oct. 18, 2012, pp. 1-3.
*Skyhook Wireless, Inc. v. Google, Inc.*, Opening Brief in Support re: Motion to Transfer Case to the United States District Court for the District of Massachusetts, filed by Google Inc., and filed in the United States District Court of Delaware, Case No. 1:2012-cv-01177-RGA, on Oct. 18, 2012, pp. 1-15.
*Skyhook Wireless, Inc. v. Google, Inc.*, Declaration of Sanjeet K. Dutta re: Motion to Transfer Case to the United States District Court for the District of Massachusetts, by Google Inc. (with Exhibits A&B and Exhibits C-J) filed in the United States District Court of Delaware, Case No. 1:2012-cv-01177-RGA, on Oct. 18, 2012, pp. 1-233.
*Skyhook Wireless, Inc. v. Google, Inc.*, Answering Brief in Opposition re: Motion to Transfer Case to the United States District Court for the District of Massachusetts filed by Skyhook Wireless Inc. and filed in the United States District Court of Delaware, Case No. 1:2012-cv-01177-RGA, on Nov. 9, 2012, pp. 1-25.
*Skyhook Wireless, Inc. v. Google, Inc.*, Declaration of James A. Milkey re: Answering Brief in Opposition, by Skyhook Wireless Inc. (with Exhibits 1-11) filed in the United States District Court of Delaware, Case No. 1:2012-cv-01177-RGA, on Nov. 9, 2012, pp. 1-98.

*Skyhook Wireless, Inc. v. Google, Inc.*, Declaration of Edward James Morgan re: Answering Brief in Opposition, by Skyhook Wireless Inc. filed in the United States District Court of Delaware, Case No. 1:2012-cv-01177-RGA, on Nov. 9, 2012, pp. 1-2.
*Skyhook Wireless, Inc. v. Google, Inc.*, Answer to Complaint, with Jury Demand by Google Inc. filed in the United States District Court of Delaware, Case No. 1:2012-cv-01177-RGA, on Nov. 13, 2012, pp. 1-12.
*Skyhook Wireless, Inc. v. Google, Inc.*, Reply Brief re: Motion to Transfer Case to the United States District Court for the District of Massachusetts filed by Google Inc. filed in the United States District Court of Delaware, Case No. 1:2012-cv-01177-RGA, on Nov. 19, 2012, pp. 1-15.
*Skyhook Wireless, Inc. v. Google, Inc.*, Supplemental Declaration of Sanjeet K. Dutta re: Reply Brief, by Google Inc. (with Exhibits K-V) filed in the United States District Court of Delaware, Case No. 1:2012-cv-01177-RGA, on Nov. 19, 2012, pp. 1-141.
*Skyhook Wireless, Inc. v. Google, Inc.*, Motion for Leave to File a Surreply in Opposition to Motion to Transfer Venue Pursuant to 28 U.S.C. § 1404(a)—filed by Skyhook Wireless Inc. (with 2 Attachments) filed in the United States District Court of Delaware, Case No. 1:2012-cv-01177-RGA, on Nov. 30, 2012, pp. 1-9.
*Skyhook Wireless, Inc. v. Google, Inc.*, Answering Brief in Opposition re Motion for Leave to File a Surreply in Opposition to Motion to Transfer Venue Pursuant to 28 U.S.C. § 1404(a) filed by Google Inc. filed in the United States District Court of Delaware, Case No. 1:2012-cv-01177-RGA, on Dec. 14, 2012, pp. 1-5.
*Skyhook Wireless, Inc. v. Google, Inc.*, Sur-Reply Brief re Motion to Transfer Case to the United States District Court for the District of Massachusetts, filed by Skyhook Wireless Inc. filed by Google Inc. filed in the United States District Court of Delaware, Case No. 1:2012-cv-01177-RGA, on Dec. 28, 2012, pp. 1-4.
*Skyhook Wireless, Inc. v. Google, Inc.*, Order Granting Motion to Transfer Case to the United States District Court for the District of Massachusetts, filed by Google Inc., Signed by Judge Richard G. Andrews on Jan. 15, 2013, filed by Google Inc. filed in the United States District Court of Delaware, Case No. 1:2012-cv-01177-RGA, on Jan. 15, 2013, pp. 1.
"Terminal Equipment and Protocols for Telematic Services: Information Technology-Digital Compression and Coding of Continuous-Tome Still Images—Requirements and Guidelines," International Telecommunication Union, Sep. 1992, pp. 1-186.
"Written Opinion of the International Searching Authority," International Application No. PCT/US05/39208, Jan. 29, 2008, pp. 1-3.
Bahl, Paramvir et. al., "Enhancing the Security of Corporate Wi-Fi Networks Using DAIR", MobiSys '06, Jun. 19-22, 2006, p. 1-14.
Blackwell, Gary, "Using WiFilCellular in P2P Positioning", http://www.wi-fiplanet.com/news/article.php/3572001, Dec. 19, 2005, p. 1-4.
Battiti, Roberto et. al., "Optimal Wireless Access Point Placement for Location-Dependent Services", Dept. of Information & Comm. Tech., University of Trento, Technical Report # DIT-03-052, Oct. 2003, p. 1-14.
Bowen III, et. al., "Combining Position Estimates to Enhance User Localization," WPMC, Sep. 17-20, 2006, p. 1-5.
Charibai, Youssef, "Localization in Wireless Sensor Networks", Master's Degree Project, Stockholm, Sweden, 2005, p. 1-73.
Ciurana, Marc et. al., "Indoor Tracking in WLAN Location with TOA Measurements," MobiWAC '06, Torremolinos, Malaga, Spain, Oct. 2, 2006, p. 1-5.
Ganu, Sachin et. al., "Infrastructure-based location estimation in WLAN networks" Wireless Communications and Networking Conference, 2004. vol. 1, Mar. 21-25, 2004, p. 1-6.
Ibach, Peter et. al., "WLAN-based Asset Tracking for Warehouse Management," IADIS International Conference e-Commerce. Porto, Portugal, Dec. 15-17, 2005, p. 1-8.
Izquierdo, F. et. al., "Performance evaluation of a TOA-based trilateration method to locate terminals in WLAN," Internation Symposium on Wireless Pervasive Computing, Jan. 16-18, 2006, p. 1-6.
Kaemarungsi, Kamol and Prashant Krishnamurthy, "Properties of Indoor Received Signal Strength for WLAN Location Fingerprinting", Telecommunications Program, School of Information Sciences, University of Pittsburgh, 2004, pp. 1-10.

(56) References Cited

OTHER PUBLICATIONS

Ladd, Andrew et. al., "Use Wireless Ethernet for Localization," Ladd et. al., IEEE/RSJ International Conference on Intelligent Robots and Systems (IROS'02), Lausanne, Switzerland, Oct. 2002, p. 1-6.

Lee, Youngseok et. al., "Optimization of AP Placement and Channel Assignment in Wireless LANS," 27th Annual IEEE Conference on Local Computer Networks, Nov. 2002, p. 1-6.

Lenihan, Nicola, "A Local Optimal User Position System for Indoor Wireless Devices", Master's Thesis, University of Limerick, May 2004, p. 1-192.

Li, Binghao, Yufei Wang, Hyung Keun Lee, Andrew Dempster, and Chris Rizos, "A New Method for Yielding a Database of Location Fingerprints in WLAN". Communications, IEE Proceedings, vol. 152, Issue 5, Oct. 2005, p. 1-26.

Li, Binghao et. al., "Indoor Positioning Techniques Based on Wireless LAN," First IEEE International Conference on Wireless Broadband and Ultra Wideband Communications, 2006, p. 1-7.

McNally, et. al., "TRACER: In-vehicle, GPS-based, Wireless Technology for Traffic Surveillance and Management," California Partners for Advanced Transit and Highways, Jul. 1, 2003, p. 1-81.

Niculescu, D. et al., "Ad hoc positioning system (APS) Using AOA", INFOCOM 2003, vol. 3, Mar. 30-Apr. 3, 2003, p. 1-10.

Pahlavan, Kaveh et. al., *Indoor Geolocation Science and Technology*, IEEE Communications Magazine, Feb. 2002, p. 1-7.

Pahlavan, Kaveh et. al., "Wideband Radio Propagation Modeling for Indoor Geolocation Applications", IEEE Communications Magazine, Apr. 1998, p. 1-6.

Pavon, Javier et. al., "Link Adaptation Strategy for IEEE 802.1 WLAN via Received Signal Strength Measurement," IEEE International Conference on Communications 2003. Anchorage, AK, May 11-15, 2003, p. 1-6.

Prasithangaree, P., Krishnamurthy and P.K. Chrysanthis, "On Indoor Position Location with Wireless LANS", Telecommunications Program, University of Pittsburgh, Pittsburgh PA, Sep. 2002, pp. 1-5.

Priyantha, Nissanka et. al., "The Cricket Location-Support System", 6th ACM International Conference on Mobile Computing and Networking. Boston, MA, Aug. 2000, p. 1-12.

Pyo, Jong-Sun, et. al., "Development of a map matching method using the multiple hypothesis technique," Pyo et. al., 2001 IEEE Intelligent Transportation Systems Conference Proceedings, Oakland CA, Aug. 2001, p. 1-5.

Rahem et. al., "The Horus WLAN Location Determination System," In Communications Networks & Distributed Systems Modeling & Simulation Conference, Jun. 2005, p. 1-14.

Rao, Sanjay, "An Intelligent Home Using Wireless Location Networks and Real Time Messaging for Patients with Heart Failure," MIT Thesis, Dec. 20, 2002, published on Jul. 30, 2003, p. 1-76.

Rehim, "Horus.: A WLAN-Based Indoor Location Determination System", Ph.D. Dissertation, University of Maryland, College Park, 2004, p. 1-127.

Rerrer, Ulf, "Location-awareness for a Service-oriented Architecture Using WLAN Positioning", Department of Computer Science, Paderborn University, Germany, 2005, pp. 1-6.

Roos, Teemu et. al., "A Probabilistic Approach to WLAN User Location Estimation," Intl. J. of Wireless Information Networks, vol. 9, No. 3, Jul. 2002, p. 1-10.

"Seattle's PlaceLab," www.dailywireless.org/2003110117/Seattlesplacelab/, Oct. 17, 2003, p. 1-5.

Shih, Johnny, "Wireless LAN Location System", School of Information Technology and Electrical Engineering, University of Queensland, Nov. 2003, p. 1-136.

Singh, Reetu et. al., "Location Determination Using WLAN in Conjunction with GPS Networks" Vehicular Technology Conference—Spring 2004, vol. 5, May 2004, p. 1-5.

*Skyhook Wireless, Inc. v. Google, Inc.*, Amended Complaint for Patent Infringement against Google, Inc., filed by Skyhook Wireless, Inc. (with Exhibits A-M) filed in the United States District Court of Massachusetts, Case No. 1:10-cv-11571-RWZ, on Mar. 29, 2013, pp. 1-291.

*Skyhook Wireless, Inc. v. Google, Inc.*, Answer to Counterclaim by Skyhook Wireless, Inc. filed in the United States District Court of Massachusetts, Case No. 1:10-cv-11571-RWZ, on May 8, 2013, pp. 1-6.

*Skyhook Wireless, Inc. v. Google, Inc.*, Defendant Google Inc.'s Answer to Amended Complaint, Counterclaim against Skyhook Wireless, Inc. by Google, Inc. (with Exhibit A) filed in the United States District Court of Massachusetts, Case No. 1:10-cv-11571-RWZ, on Apr. 24, 2013, pp. 1-62.

*Skyhook Wireless, Inc. v. Google, Inc.*, Motion for Partial Summary Judgment Google's Motion for Partial Summary Judgment of Invalidity for Indefiniteness Under 35 U.S.C. § 112 ¶ 2 (with Exhibit A) filed in the United States District Court of Massachusetts, Case No. 1:10-cv-11571-RWZ, on Sep. 12, 2013, pp. 1-4.

*Skyhook Wireless, Inc. v. Google, Inc.*, Preliminary Invalidity Disclosures by Google, Inc. (with Exhibits A-I) filed in the United States District Court of Massachusetts, Case No. 1:10-cv-11571-RWZ, on Jun. 14, 2013, pp. 1-1629.

*Skyhook Wireless, Inc. v. Google, Inc.*, Preliminary Invalidity and Non-Infringement Contentions by Google, Inc. filed in the United States District Court of Massachusetts, Case No. 1:10-cv-11571-RWZ, on Jun. 14, 2013, pp. 1-50.

*Skyhook Wireless, Inc. v. Google, Inc.*, First Amended Preliminary Invalidity Disclosures by Google, Inc. (with Exhibits A-B) filed in the United States District Court of Massachusetts, Case No. 1:10-cv-11571-RWZ, on Sep. 10, 2013, pp. 1-389.

*Skyhook Wireless, Inc. v. Google, Inc.*, Response by Skyhook Wireless, Inc. to Sealed document Google's Opening Claim Construction Brief filed in the United States District Court of Massachusetts, Case No. 1:10-cv-11571-RWZ, on Sep. 16, 2013, pp. 1-34.

Stoleru, Radu et. al., "Probability Grid: A Location Estimation Scheme for Wireless Sensor Networks," 2004 IEEE Comm. Society Conference, Oct. 4-7, 2004, p. 1-10.

"UbiComp 2003", Ubicomp.org,<http://www.ubicomp.org/ubicomp2003/>,2003, last visited Apr. 19, 2013, pp. 1-2.

U.S. Appl. No. 60/734,631, filed Nov. 7, 2005 by Stephen Edge for Location Solutions Applicable to Wireless Local Area Networks (WLANs), pp. 1-11.

U.S. Appl. No. 60/748,225, filed Dec. 6, 2005 by Stephen Edge for Location Solution Applicable to a Terminal Served by a Wireless LAN, pp. 1-32.

Vandenussche, Katelijne, "Fine-grained Indoor Localisation Using Wireless Sensor Networks", Master's Thesis, Delft University of Technology, Aug. 2005, p. 1-64.

Yu, Ke et. al., "WLAN-Based, Indoor Medical Residents Positioning System", Wireless and Optical Communications Network 2005, Mar. 6-8, 2005, p. 1-5.

*Skyhook Wireless, Inc. v. Google, Inc.*, Memorandum of Decision filed in the United States District Court of Massachusetts, Case No. 1:10-cv-11571-RWZ, on Mar. 6, 2014, pp. 1-30.

*Skyhook Wireless, Inc. v. Google, Inc.*, Second Amended Invalidity Disclosures for the Skyhook II Patents by Google, Inc. (with Exhibits A-G) filed in the United States District Court of Massachusetts, Case No. 1:10-cv-11571-RWZ, on Apr. 30, 2014, pp. 1-1235.

\* cited by examiner

SYSTEM AND METHOD FOR ESTIMATING POSITIONING ERROR WITHIN A WLAN-BASED POSITIONING SYSTEM

CROSS-REFERENCE TO RELATED APPLICATIONS

This application is a continuation of U.S. patent application Ser. No. 12/966,001, entitled System and Method For Estimating Positioning Error Within A WLAN-Based Positioning System, filed Dec. 13, 2010, now U.S. Pat. No. 8,019,357, which is a continuation of U.S. patent application Ser. No. 11/625,450, entitled System and Method For Estimating Positioning Error Within A WLAN-Based Positioning System, filed Jan. 22, 2007, now U.S. Pat. No. 7,856,234, which claims the benefit under 35 U.S.C. §119(e) of U.S. Provisional Patent Application Ser. No. 60/864,716, filed on Nov. 7, 2006, entitled Estimating Positioning Error for a WLAN Based Positioning System, all of which are herein incorporated by reference in their entirety.

This application is related to the following U.S. patent applications, the contents of which are hereby incorporated by reference:

U.S. patent application Ser. No. 11/261,987, entitled Method and System for Building a Location Beacon Database, filed on Oct. 28, 2005, now U.S. Pat. No. 7,403,762;

U.S. patent application Ser. No. 11/430,079, Estimation Of Speed and Direction of Travel In A WLAN Positioning System, filed on May 8, 2006, now U.S. Pat. No. 7,835,754;

U.S. patent application Ser. No. 11/430,064, Estimation of Speed and Direction of Travel In A WLAN Positioning System Using Multiple Position Estimations, filed on May 8, 2006, now U.S. Pat. No. 7,551,929;

U.S. patent application Ser. No. 11/430,222, Estimation of Position Using WLAN Access Point Radio Propagation Characteristics In a WLAN Positioning System, filed on May 8, 2006, now U.S. Pat. No. 7,515,578; and U.S. patent application Ser. No. 11/430,224, Calculation of Quality of WLAN Access Point Characterization for Use In a WLAN Positioning System, filed on May 8, 2006, now U.S. Pat. No. 7,551,579.

BACKGROUND

1. Field of the Invention

The invention generally relates to estimating error in a WLAN-based positioning system and, more specifically, to determining the expected error of an estimated position of a WLAN-enabled mobile device using WLAN-based positioning system.

2. Discussion of Related Art

Estimation is the process of finding the most probable value for a target parameter(s) based on a set of observable samples, which are correlated with the target parameter(s). Accuracy of the estimation can vary based on the quality of the observed samples. Quantifying the quality of estimation is one of the main subjects in estimation theory, and in most of the cases, it is an even harder problem than estimating the target parameter. A satellite based positioning system is one of the early systems that was introduced for global positioning, and for the same reason it is called Global Positioning System (GPS). In the GPS network, accuracy of estimation is also determined and reported to end users. The estimation error in the GPS network is presented in different ways. The error estimation is determined by considering the entire network, and it is called Delusion Of Precision (DOP) for horizontal and vertical error. The DOP value is an indicator of error, and it can be translated to error in meters as well.

Metro wide WLAN-based positioning systems have been explored by a couple of research labs, but none of them provided an expected error of position estimation. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system.

There have been a number of commercial offerings of WLAN location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (*LoCA* 2005) at Pervasive 2005, May 2005, and Hazas, M., Scott, J., Krumm, J.: Location-Aware Computing Comes of Age, IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding, typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly, outdoor radio propagation is fundamentally different than indoor radio propagation, rendering these indoor positioning techniques almost useless in a wide-area scenario.

There are millions of commercial and private WLANs deployed so far and this number is growing everyday. Thus, WLAN access points are used to estimate the location of WLAN-enabled mobile devices.

SUMMARY

In one aspect, the invention features a method of estimating an expected error of a position estimate for use in a WLAN positioning system that estimates the position of a WLAN-enabled device. The WLAN-enabled device receives signals transmitted by a WLAN access point in range of the WLAN-enabled device. The method estimates the position of the WLAN-enabled device based on the received signals from the WLAN access point in range of the WLAN enabled device. The method also estimates an expected error of the position estimate based on characteristics of the WLAN access point in range of the WLAN enabled device, wherein the expected error predicts a relative accuracy of the position estimate.

In another aspect of the invention, the position estimate of the WLAN-enabled device is based on signals from more than one WLAN access point in range of the WLAN-enabled device. In a further aspect, the expected error of the position estimate is based on characteristics from more than one WLAN access point in range of the WLAN-enabled device.

In yet another aspect, the expected error of the position estimate is based on the number of access points used to estimate the position of the WLAN enabled device.

In another aspect of the invention, each of the WLAN access points has an associated signal coverage area. The expected error of the position estimate is based on at least one of the signal coverage areas of the WLAN access points used to estimate the position of the WLAN-enabled device.

In a further aspect of the invention, the expected error of the position estimate is based on the smallest signal coverage area of the WLAN access points used to estimate the position of the WLAN-enabled device.

In yet a further aspect of the invention, the coverage area for each WLAN access point is estimated by determining geographic locations at which a WLAN-enabled device receives a signal from the WLAN access point, determining the standard deviation of the coverage area based on the determined geographic locations, and estimating the coverage area of the WLAN access point based on the standard deviation of the coverage area.

In one aspect of the invention, each of the WLAN access points has a geographic position, and the expected error of the position estimate is based on the spatial spread of the geographic positions of the access points used to estimate the position of the WLAN-enabled device. The spatial spread is based on a distance between the geographic positions of the WLAN access points used to estimate the position of the WLAN-enabled device.

In another aspect of the invention, a position estimate is used in conjunction with other position estimates to derive at least one of position, speed, and direction of travel of the WLAN-enabled device and the weight given to the position estimate is based on the expected error of the position estimate. In one aspect, the position estimate is used only if the expected error of the position estimate is lower than a predetermined threshold. In a further aspect, at least one of the other position estimates is based on received signals from WLAN access points in range of the WLAN enabled device. In other aspects, at least one of the other position estimates is provided by a GPS-based positioning system.

In yet a further aspect, the invention features a system for estimating an expected error of a position estimate for use in a WLAN positioning system that estimates the position of a WLAN-enabled device. The system includes: a WLAN-enabled device for receiving signals transmitted by a WLAN access point in range of the WLAN-enabled device, position estimating logic for estimating the position of the WLAN-enabled device based on the received signals from the WLAN access point in range of the WLAN enabled device, and error estimating logic for estimating an expected error of the position estimate based on characteristics of the WLAN access points in range of the WLAN enabled device, wherein the expected error predicts a relative accuracy of the position estimate.

DETAILED DESCRIPTION

Figure 1:
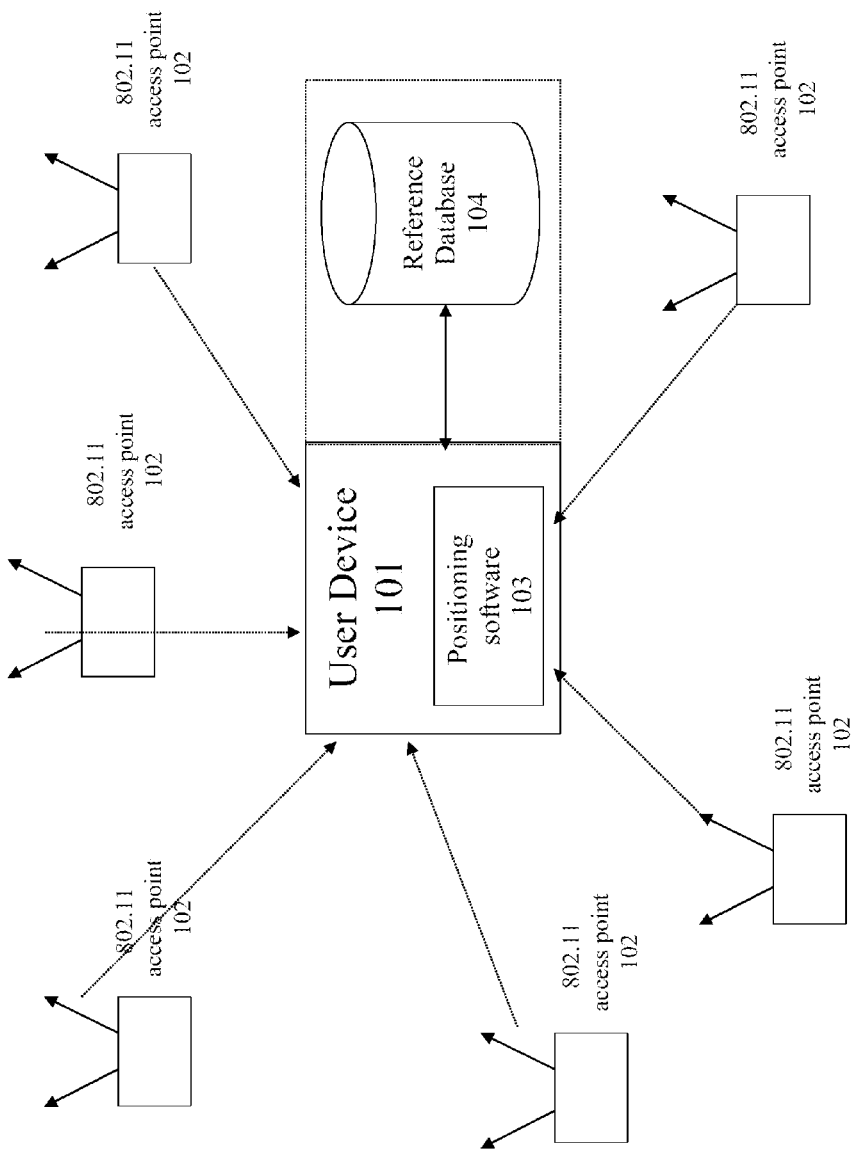
FIG. 1 illustrates certain embodiments of a WLAN positioning system.

Preferred embodiments of the invention estimate the error associated with a derived position provided by a WLAN positioning system. The incorporated patent applications describe a WLAN-based positioning system that can derive and provide estimated positions for WLAN-enabled devices.

Preferred embodiments of the invention determine and update the expected error of position estimates of a WLAN-based positioning system that use public and private WLAN access points. (Note that 802.11, 802.11b, 802.11e, 802.11n, and WiFi are examples of WLAN standards.) The user's mobile device periodically scans and detects public and private WLAN access points and also logs signals characteristics of each of the WLAN access points, for example, Received Signal Strength (RSS), Time Difference of Arrival (TDOA), or Time difference of Arrival (TOA) corresponding to each of the WLAN access points. In some embodiments, the mobile device itself determines the expected error of a position estimate. In other embodiments, the mobile device sends the results of scanning the surrounding WLAN access points to a central site where a central server determines the expected error.

The expected error of a WLAN position estimate may be used to quantify the quality of the position estimate. This may be useful when multiple position estimates are combined or when the WLAN-based position estimates are combined with other position estimation techniques, e.g., GPS position estimation. The expected error of each position estimate may be used as a weighting factor when a series of position estimates are combined. For example, in order to increase the accuracy of single position estimate, multiple position estimates may be a weighted average. In this case, the expect error of each position estimate is used as a weight in a weighted average calculation.

In addition, a series of position estimates may be combined to derive the mobile device's speed of travel or bearing. When such a series of position estimates are combined, the expected error of each estimate is used as a corresponding quality metric of the estimation, which enables the optimal combination of the series of position estimates based on their quality.

For example, in a series of ten position estimates, assume all but the seventh position estimate have a relatively low expected error of position estimation, while the seventh position estimate has a relatively high expected error. When the mobile device uses this series of position estimates to derive the speed of the mobile device, the mobile device may exclude the seventh position estimate in the speed determination because its relatively high expected error value indicates that that particular position estimate is of low quality and, thus, may be unreliable.

The expected error of a position estimates may also be used to determine the expected error after combining the position estimate results. For example, if the position estimate results are used to determine speed of travel, the expected errors of individual position estimates are combined to determine the estimation error of the speed of travel.

Certain embodiments of the invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, and also including but not limited to U.S. patent application Ser. No. 11/430,224, entitled Calculation of Quality of WLAN Access Point Characterization for Use in a WLAN Positioning System, and U.S. patent application Ser. No. 11/430,222, entitled Estimation of Position Using WLAN Access Point Radio Propagation Characteristics in a WLAN Positioning System, both filed on May 8, 2006, the contents of which are hereby incorporated by reference in their entirety. Those applications taught specific ways to gather high quality location data for WLAN access points so that such data may be used in location based services to determine the geographic position of a WLAN-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

FIG. 1 depicts a WLAN positioning system (WPS). The positioning system includes positioning software [103] that resides on a user device [101]. Throughout a particular target geographical area, there are fixed wireless access points [102] that broadcast information using control/common channel broadcast signals. The client device monitors the broadcast signal or requests its transmission via a probe request. Each access point contains a unique hardware identifier known as a MAC address. The client positioning software 103 receives signal beacons from the 802.11 access points 102 in range and determines the geographic location of the user device 101 using characteristics from the signal beacons. Those characteristics include the access point's MAC address and the strengths of the signal reaching the client device. The client software compares the observed 802.11 access points with those in its reference database [104] of access points, which may or may not reside on the device as well (i.e., in some embodiments, the reference database can be remotely located). The reference database contains the estimated geographic locations and power profile of all the access points the gathering system has collected. The power profile may be generated from a collection of readings that represent the power of the signal from various locations. Using these known locations and power profiles, the client software determines the relative position of the user device [101] and determines its geographic coordinates in the form of latitude and longitude readings. Those readings are then provided to location-based applications such as friend finders, local search web sites, fleet management systems and E911 services.

Preferred embodiments of the invention may be used in a WLAN-enabled device to determine and update expected error of position estimates. For example, techniques in accordance with embodiments of the invention may be incorporated in logic embedded in positioning software [103] of the WLAN-enabled device of FIG. 1.

Under one embodiment of the invention, the expected error of a position estimate of a WLAN-enabled mobile device is estimated based on the coverage area of all of the access points used to locate the WLAN-enabled mobile device. In other words, if all the detected access points are considered, the signal foot prints (or the coverage areas) of the detected access points are used to determine the expected error of the position estimate. In one illustrative implementation, the expected error of the position estimate is bounded by the smallest coverage area of the access points that are used to estimate the location of a WLAN-enabled mobile device. Therefore, the method is based on finding the smallest coverage area among the access points that are used to estimate the location of an end user in a WLAN-based positioning system. The expected error is directly correlated with the smallest coverage of detected WLAN access points. If the expected error is denoted by e, and the smallest coverage is denoted by $C_{min}$, the error can be written as a function of the smallest coverage as follows:

$$e \propto f(C_{min})$$

The notation $\propto$ means direct dependency. One example of the function is as follows:

$$e = K_c C_{min}$$

The parameter $K_c$ is a constant number to scale the value of smallest coverage area to the actual error in meters. The parameter $K_c$ translates the minimum coverage in $m^2$ to error in meters. The parameter $K_c$ is found empirically by considering enough samples in the entire coverage area and finding the actual error and the $C_{min}$ value. The actual error can be determined by comparing the estimated position provided by the WLAN positioning system with a known position.

The coverage area or the footprint of a WLAN access point is defined as the area in which a WLAN-enabled mobile device can detect the particular access point. The coverage area of an access point is found by systematically scanning a target geographical area containing many access points and recording Received Signal Strength (RSS) samples at known locations. When all the samples of a given access point are considered, the standard deviation of the location of the RSS samples is used as an indicator of the size of the coverage area of the access point. In some embodiments, all RSS samples are considered. In other implementations, some RSS samples are ignored if the RSS is below a given threshold. If the total number of RSS samples of an access point is denoted by M and the corresponding location of RSS sample i is denoted by $(x_i, y_i)$, the standard deviation, $\sigma$, of coverage area is calculated as follows:

$$\sigma = \sqrt{\sigma_x^2 + \sigma_y^2},$$

in which $\sigma_x$ and $\sigma_y$ are the standard deviation of $x_i$ and $y_i$ over all M samples, respectively.

Figure 2:
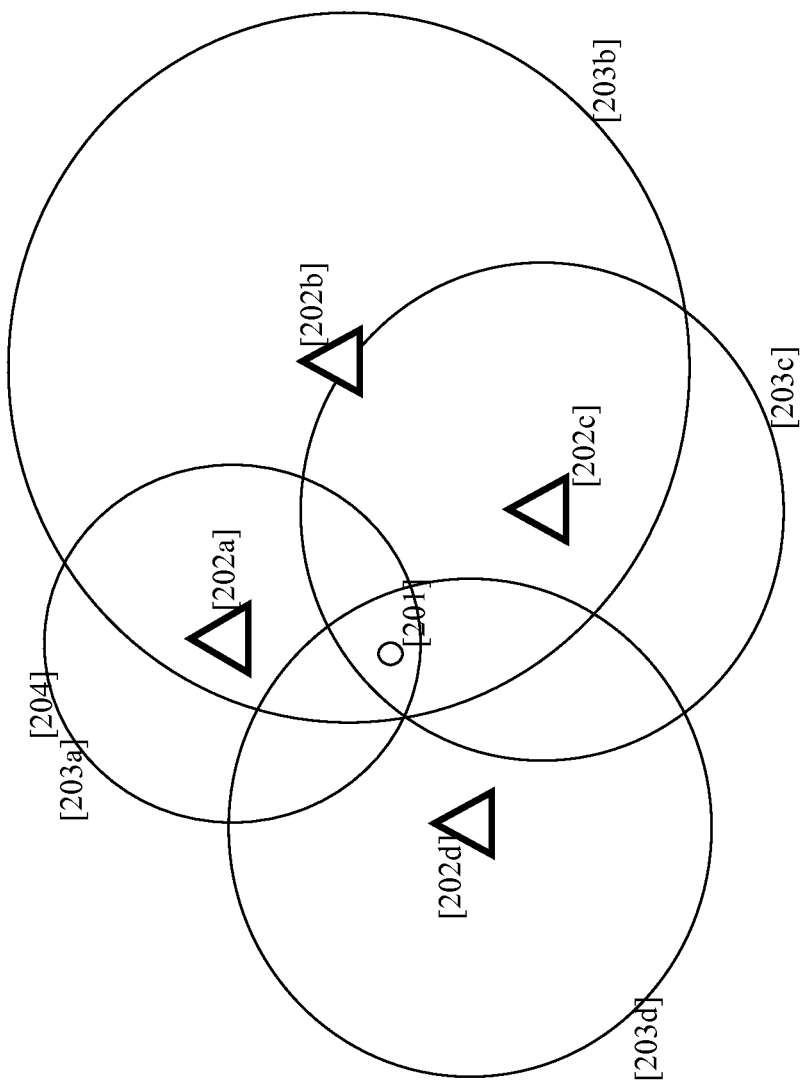
FIG. 2 illustrates an example of a WLAN-enabled mobile device and surrounding access points and their corresponding coverage areas.

FIG. 2 illustrates an example of a WLAN-enabled mobile device and WLAN access points in its surroundings. In FIG. 2, the user [201] detects WLAN access points [202a-d] in range and estimates its location by using the detected WLAN access points as reference points. The access points [202a-d] in range have different coverage sizes [203a-d]. The estimation error is bounded by the minimum coverage [204] of the detected access points [202a-d]. For example, if the radius of the coverage area [203a] of the access point [202a] is 100 meters, the maximum estimation error corresponding to the position of user [201] is 100 meters.

Figure 3:
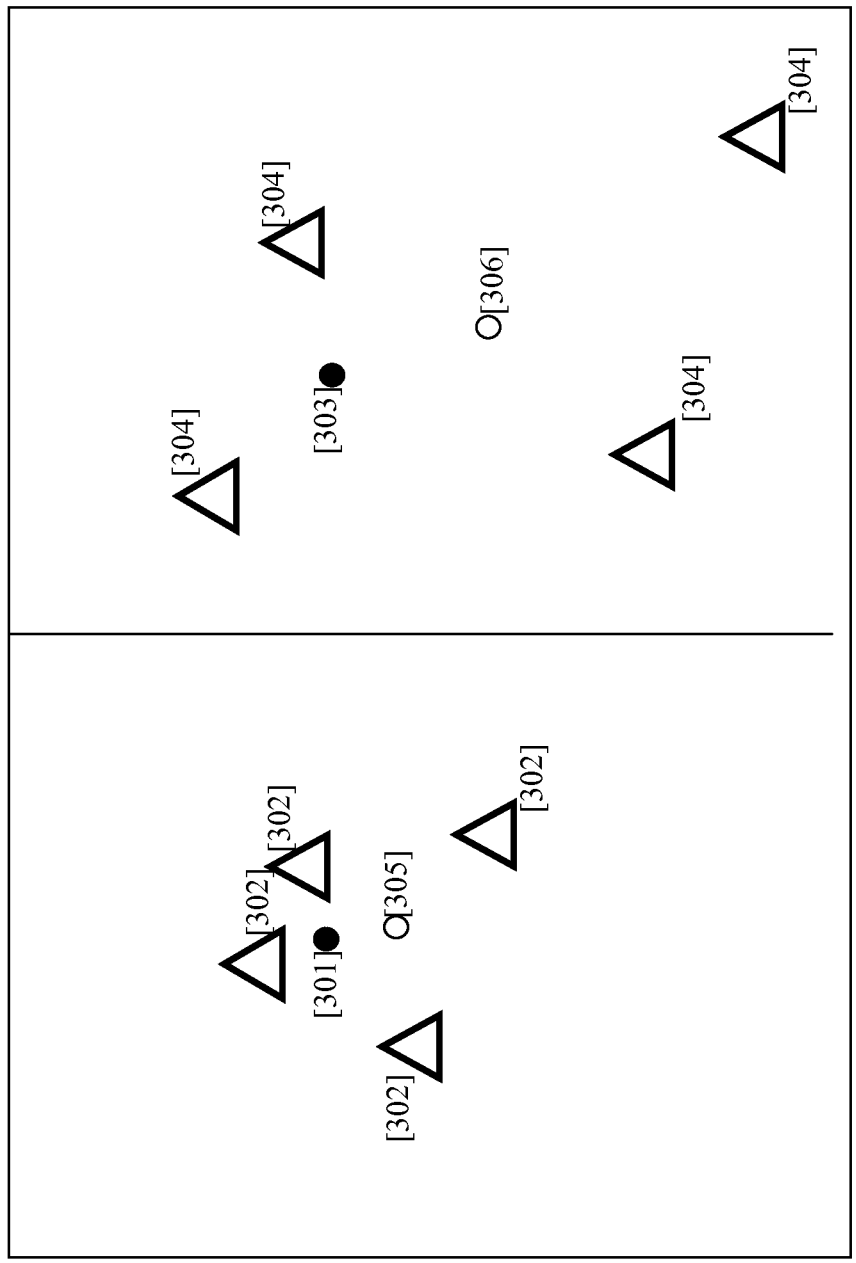
FIG. 3 illustrates an example of the impact of the spatial spread of detected WLAN access points on the accuracy of position estimation of a WLAN-enabled mobile device.

Under other embodiments of the invention, the expected error of a position estimation is estimated based on how the detected access points are spatially spread, i.e., the distance between the geographic location of the detected access points. An example of the impact of the spatial spread of the detected access points on the position estimation error is illustrated in FIG. 3. FIG. 3 illustrates a WLAN-enabled mobile device [301] with detected access points [302] and WLAN-enabled mobile device [303] with detected access points [304]. The estimated location of mobile devices [301] and [303] are shown by circles [305] and [306] respectively. The figure illustrates a smaller estimation error for mobile device [301] with a relatively smaller spatial spread of detected access points than mobile device [303], which has a relatively larger spatial spread of detected access points. The spatial spread of access points can be measured by the standard deviation of their location in the X and Y axis, $\sigma_{sx}$ and $\sigma_{sy}$, and then finding the total spatial spread standard deviation as follows:

$$\sigma_s = \sqrt{\sigma_{sx}^2 + \sigma_{sy}^2}$$

The expected error directly correlates with the standard deviation of spatial spread. So, $$e \propto f(\sigma_s).$$

An example of the above function is as follows:

$$e = K_s \sigma_s^2$$

The parameter $K_s$ is a constant number to scale the output value to error in meters. The parameter $K_s$ translates the square of the standard deviation in m$^2$ to error in meters. The parameter $K_c$ is found empirically by considering enough samples in the entire coverage area and finding the actual error and the standard deviation square value. Error in meters is calculated by using the technique described above.

Figure 4:
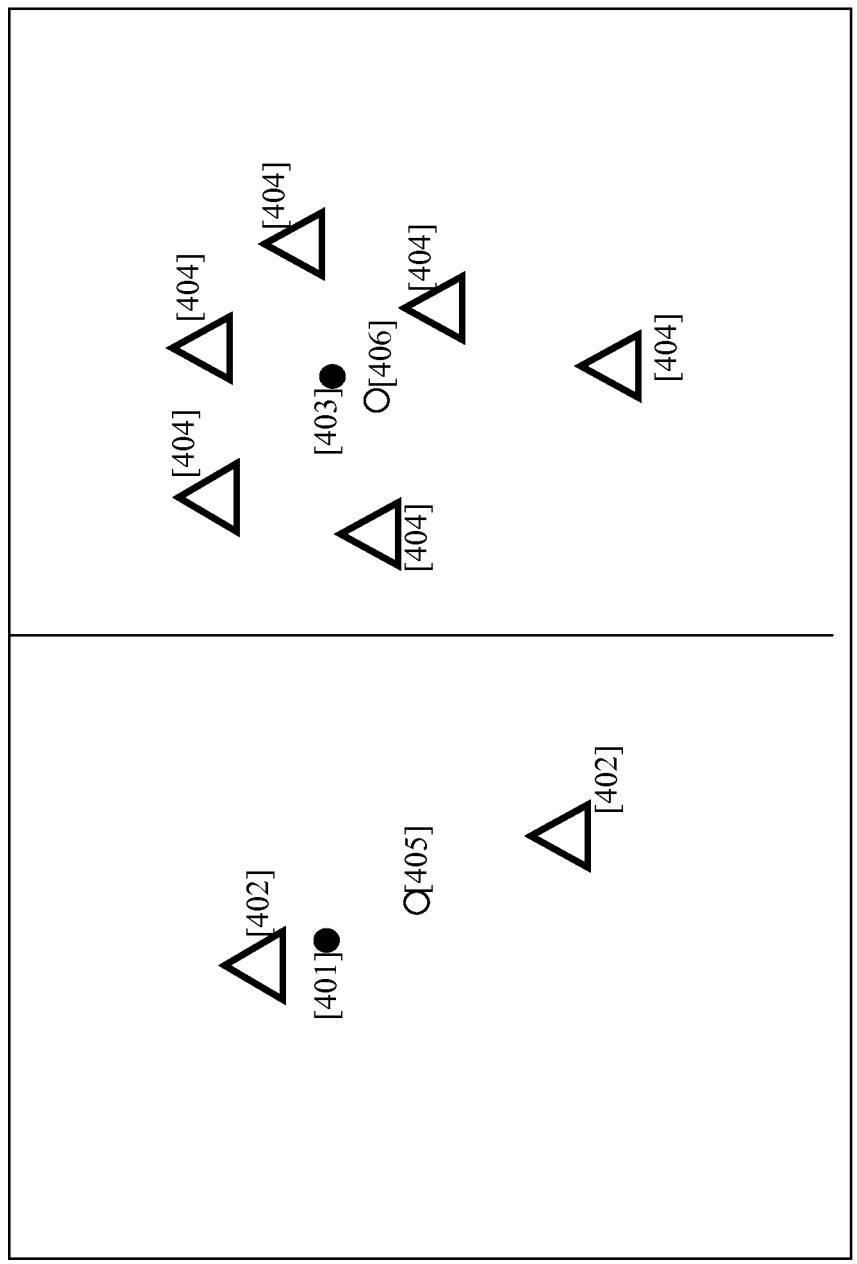
FIG. 4 illustrates an example of the impact of the number of detected WLAN access points on the accuracy of a position estimate of a WLAN-enabled mobile device.

Under other embodiments of the invention, the expected error of a WLAN-enabled mobile device in a WLAN positioning system is estimated based on the number of access points that are detected. As illustrated in FIG. 4, the expected error decreases as the number of detected access points increases. FIG. 4 shows two WLAN-enabled mobile devices [401] and [403], with detected access points [402] and [404], respectively, and estimated positions [405] and [406], respectively. The figure illustrates that the expected error of position estimation is lower for WLAN-enabled mobile device [403] because of the greater number of access points used to estimate it position. Therefore, the expected error is correlated with the inverse of the number of detected access points. If N denotes the number of detected access points that are used to locate an end user, the expected error can be written as follows:

$$e \propto f\left(\frac{1}{N}\right)$$

An example of the above function is as follows:

$$e = K_N \frac{1}{\sqrt{N}}$$

The parameter $K_N$ is a constant number to scale the output of the equation to error in meters. In terms of units, the parameter $K_N$ is in meters. The parameter $K_N$ is found empirically by considering enough samples in the entire coverage area and finding the actual error and the N value. Error in meters is calculated by using the technique described above.

Under other embodiments of the invention, the expected error of a WLAN-enabled mobile device in a WLAN positioning system is estimated based on combining multiple correlated parameters with error. The three parameters correlated with the expected error of a position estimate are as follows: (1) the smallest coverage of detected access points, $C_{min}$, (2) one over square root of number of detected access points, $1/\sqrt{N}$, (3) square of spatial spread of detected access points, $\sigma_s^2$.

The above parameters are correlated with the expected error, but in terms of the absolute value they have different dynamic ranges. In order to be able to combine them, their absolute values have to be normalized first. Normalization of the parameters is achieved by dividing them by the standard deviation of their dynamic range. The dynamic range is the largest and smallest absolute values of all of the access points in a given coverage area.

The normalized parameters can be simply averaged or they can be weighted according to the accuracy with which each parameter predicts the expected error and then averaged, which is called the weighted average. Weighting each component of error according to its accuracy of error prediction is more desirable and it is the optimum combining method. The next step in the weighted average approach is defining a metric for each of the parameters that measures the accuracy of the error prediction.

The correlation of each parameter with the error measures the accuracy of the error prediction of the particular error estimation method. These correlation coefficients are used to weight each method in the weighted average calculation. A correlation coefficient is a statistical parameter, and it is determined globally for each parameter based on a sufficient number of samples for the targeted geographic area by finding the actual error of a position estimate and also finding the estimated value of the parameter and then determining the correlation coefficient. Therefore, the correlation coefficient shows the statistical correlation of an estimation parameter with estimation error, and it does not show exactly the quality of one sample of the parameter. For example, one instance of a position determination might have a very small estimation error, but the smallest coverage area of the detected access points might be relatively large. In this example, the smallest coverage area of the detected access points is not a good indicator of the error, but it is still weighted with the same correlation coefficient as other samples. Therefore, the expected error using weighted average of the error parameters is written as follows:

$$e \propto \left[ C_c \frac{C_{min}}{\sigma(C_{min})} + C_N \frac{\sqrt{1/N}}{\sigma\left(\sqrt{1/N}\right)} + C_s \frac{\sigma_s^2}{\sigma(\sigma_s^2)} \right] \times \frac{1}{(C_c + C_N + C_s)}$$

In the above equation, the standard deviation operator is shown with $\sigma$ and the correlation coefficients for $C_{min}$, N, and $\sigma_s$ are shown with $C_c$, $C_N$, and $C_s$, respectively. The correlation coefficients are unitless. The correlation coefficients are found empirically by considering enough samples in the entire coverage area and comparing the expected error with the actual error for each sample.

Under other embodiments of the invention, the expected error of a position estimate is found in meters from a parameter that is correlated with the expected error. Assuming that there is a parameter correlated with the expected error, the estimation error in meters is found by mapping the distribution of the error parameter into the actual distance error in meters as found during scanning the targeted geographic area. Therefore, if error in meters is denoted by $d_e$, it is found as the result of the mapping and can be calculated as follows:

$$d_e = \left(\frac{e - \bar{e}}{\sigma(e)}\right)\sigma(d_e) + \bar{d}_e$$

Note that the average value of a random process is shown with a bar on the variable and the standard deviation operator is shown with $\sigma$. The average and the standard deviation of $d_e$ and $e$ are found empirically by considering the distribution of these parameters over samples that are collected from the entire coverage area. An example of the standard deviation and the average value of the parameters are as follows:

$\sigma(C_{min}) = 2.7546$ $\sigma(\sqrt{1/N}) = 0.1721$ $\sigma(\sigma_s^2) = 3.8707 \times 10^{-7}$ $\bar{e} = 1.5613$ $\sigma_e = 0.7458$ $\bar{d}_e = 38.1$ m $\sigma_{d_e} = 29.0$ m Note that the standard deviation of spatial spread of detected access points is determined based on the latitude and longitude of access points.

An example of the correlation coefficients is as follows:

$0.30 \leq C_c, C_N, C_s \leq 0.37$

It will be appreciated that the scope of the present invention is not limited to the above described embodiments, but rather is defined by the appended claims; and that these claims will encompass modifications of and improvements to what has been described.

What is claimed is:

1. In a Wireless Local Area Network (WLAN) positioning system for estimating the position of a WLAN-enabled device, a method of estimating an expected error of a position estimate of the WLAN-enabled device, the method comprising:
receiving an identity of a plurality of WLAN access points in range of the WLAN-enabled device, the plurality of WLAN access points each having an estimated geographic location; and
estimating an expected error, in terms of distance, of a position estimate of the WLAN-enabled device that would result from using the estimated geographic locations of the plurality of WLAN access points in a position estimation determination, based on a spatial spread of WLAN access points in range of the WLAN enabled device,
wherein the spatial spread is a measure of distances between the estimated geographic locations of the plurality of WLAN access points in range of the WLAN enabled device, and the expected error of the position estimate predicts a relative accuracy of the position estimate.

2. The method of claim 1, the estimating the expected error of the position estimate that would result from using the estimated geographic location of the plurality of WLAN access points in a position estimation determination being further based on the estimated geographic locations of the plurality of WLAN access points.

3. The method of claim 1, the receiving the identity including receiving aggregate statistics associated with the estimated geographic locations of the plurality of WLAN access points, and the estimating the expected error that would result from using the estimated geographic locations of the plurality of WLAN access points in a position estimation determination being based on the aggregate statistics.

4. The method of claim 3, the aggregate statistics being at least one of a maximum value, a minimum value, a median value, an average value, a standard deviation, and a sum.

5. The method of claim 1, further comprising estimating the position of the WLAN-enabled device based on the estimated geographic locations of the plurality of WLAN access points in range of the WLAN enabled device only when the expected error of the position estimate is lower than a predetermined threshold.

6. The method of claim 1, the WLAN positioning system using public and private WLAN access points for estimating the position of the WLAN-enabled device.

7. The method of claim 1, the WLAN positioning system using public and private WLAN access points that are deployed over a metropolitan area.

8. The method of claim 1, the estimating the expected error of the position estimate that would result from using the estimated geographic locations of the plurality of WLAN access points in a position estimation determination being based on a weighted average of estimated error based on the measure of distances between the estimated geographic locations of the plurality of WLAN access points combined with an estimated error determined using another error estimation method.

9. In a Wireless Local Area Network (WLAN) positioning system for estimating the position of a WLAN-enabled device, a method of estimating an expected error of a position estimate of the WLAN-enabled device, the method comprising:
receiving an identity of at least one WLAN access point in range of the WLAN-enabled device, the at least one WLAN access point having an estimated signal coverage area; and
estimating an expected error, in terms of distance, of a position estimate that would result from using an estimated geographic position of the at least one WLAN access point in a position estimation determination based on the estimated signal coverage area of the at least one WLAN access point in range of the WLAN enabled device,
wherein the estimated signal coverage area is an area in which WLAN enabled devices can detect the WLAN access point, and the expected error of the position estimate predicts a relative accuracy of the position estimate.

10. The method of claim 9, the estimated signal coverage area for the at least one WLAN access point being estimated based on systematically scanning a target geographical area and recording received signal strength samples at known geographic locations.

11. The method of claim 10, the estimated signal coverage area being based on a subset of the received signal strength samples recorded at known geographic locations.

12. The method of claim 11, further comprising determining members of the subset based on a value of the received signal strength sample.

13. The method of claim 12, the members of the subset including only those received signal strength samples having a value above a predetermined threshold value.

14. The method of claim 11, the estimated signal coverage area being based on statistics associated with the subset of the received signal strength samples recorded at known geographic locations.

15. The method of claim 9, the estimated signal coverage area for the at least one WLAN access point being estimated based on a power profile associated with the at least one WLAN access point, the power profile representing a power value of a signal from the at least one WLAN access point at various geographic locations.

16. The method of claim 9, the estimating the expected error of the position estimate being based on estimated signal coverage area of more than one WLAN access point in range of the WLAN-enabled device.

17. The method of claim 9, the receiving the identity of at least one WLAN access point in range of the WLAN-enabled device including receiving the identities of a plurality of WLAN access points in range of the WLAN-enabled device, the WLAN access points of the plurality having aggregate statistics of the estimated coverage areas of WLAN access points of the plurality, and the estimating the expected error that would result from using the estimated geographic locations of the plurality of WLAN access points in a position estimation determination being based on the aggregate statistics.

18. The method of claim 17, the aggregate statistics being at least one of a maximum value, a minimum value, a median value, an average value, a standard deviation, and a sum.

19. The method of claim 9, further comprising estimating the position of the WLAN-enabled device based on the estimated geographic location of the at least one WLAN access point in range of the WLAN enabled device only when the expected error of the position estimate is lower than a predetermined threshold.

20. The method of claim 9, the WLAN positioning system using public and private WLAN access points for estimating the position of the WLAN-enabled device.

21. The method of claim 9, the WLAN positioning system using public and private WLAN access points that are deployed over a metropolitan area.

22. In a Wireless Local Area Network (WLAN) positioning system for estimating the position of a WLAN-enabled device, a system for estimating an expected error of a position estimate of the WLAN-enabled device, the system for estimating the expected error comprising:
identity receiving logic for receiving the identity of a plurality of WLAN access points in range of the WLAN-enabled device, the plurality of WLAN access points each having an estimated geographic location; and
error estimating logic for estimating an expected error, in terms of distance, of a position estimate of the WLAN-enabled device that would result from use of the estimated geographic locations of the plurality of WLAN access points in a position estimation determination, based on spatial spread of WLAN access points in range of the WLAN enabled device,
wherein the spatial spread is a measure of distances between the estimated geographic locations of the plurality of WLAN access points in range of the WLAN enabled device, and the expected error of the position estimate predicts a relative accuracy of the position estimate.

23. The system of claim 22, the error estimating logic further basing the expected error of the position estimate on the estimated geographic location of the plurality of WLAN access points.

24. The system of claim 22, the identity receiving logic receiving aggregate statistics associated with the estimated geographic locations of the plurality of WLAN access points, and the error estimating logic estimating the expected error further based on the aggregate statistics.

25. The system of claim 24, the aggregate statistics being at least one of a maximum value, a minimum value, a median value, an average value, a standard deviation, and a sum.

26. The system of claim 22, further comprising position estimating logic for estimating the position of the WLAN-enabled device based on the estimated geographic location of the plurality of WLAN access points in range of the WLAN enabled device only when the expected error of the position estimate is lower than a predetermined threshold.

27. The system of claim 22, the WLAN positioning system using public and private WLAN access points for estimating the position of the WLAN-enabled device.

28. The system of claim 22, the WLAN positioning system using public and private WLAN access points that are deployed over a metropolitan area.

29. The system of claim 22, the error estimating logic estimating the expected error further based on a weighted average of estimated error based on the measure of distances between the estimated geographic locations of the plurality of WLAN access points combined with an estimated error determined using another error estimation method.

30. In a Wireless Local Area Network (WLAN) positioning system for estimating the position of a WLAN-enabled device, a system for estimating an expected error of a position estimate of the WLAN-enabled device, the system for estimating the expected error comprising:
signal identity receiving logic for receiving the identity of at least one WLAN access point in range of the WLAN-enabled device, the at least one WLAN access point having an estimated signal coverage area; and
error estimating logic for estimating an expected error, in terms of distance, of a position estimate of the WLAN-enabled device that would result from use of an estimated geographic location of the at least one WLAN access point in a position estimation determination, based on the estimated signal coverage area of the at least one WLAN access point in range of the WLAN enabled device,
wherein the estimated signal coverage area is an area in which WLAN enabled devices can detect the WLAN access point, and the expected error of the position estimate predicts a relative accuracy of the position estimate.

31. The system of claim 30, the estimated signal coverage area for the at least one WLAN access point being estimated based on systematically scanning a target geographical area and recording received signal strength samples at known geographic locations.

32. The system of claim 30, the estimated signal coverage area being based on a subset of the received signal strength samples recorded at known geographic locations.

33. The system of claim 32, further comprising logic for determining members of the subset based on a value of the received signal strength sample.

34. The system of claim 33, the members of the subset including only those received signal strength samples having a value above a predetermined threshold value.

35. The system of claim 32, the estimated signal coverage area being based on statistics associated with the subset of the received signal strength samples recorded at known geographic locations.

36. The system of claim 30, the estimated signal coverage area for the at least one WLAN access point being estimated based on a power profile associated with the at least one WLAN access point, the power profile representing a power value of a signal from the at least one WLAN access point at various geographic locations.

37. The system of claim 30, the error estimating logic further basing the expected error of the position estimate on estimated signal coverage area of more than one WLAN access point in range of the WLAN-enabled device.

38. The system of claim 30, the identity receiving logic receiving the identities of a plurality of WLAN access points in range of the WLAN-enabled device, the system further comprising logic for determining aggregate statistics of the estimated coverage areas of WLAN access points of the plurality, and the error estimating logic estimating the expected error further based on the aggregate statistics.

39. The system of claim 38, the aggregate statistics being at least one of a maximum value, a minimum value, a median value, an average value, a standard deviation, and a sum.

40. The system of claim 30, further comprising position estimating logic for estimating the position of the WLAN-enabled device based on the estimated geographic location of the at least one WLAN access point in range of the WLAN enabled device only when the expected error of the position estimate is lower than a predetermined threshold.

41. The system of claim 30, the WLAN positioning system using public and private WLAN access points for estimating the position of the WLAN-enabled device.

42. The system of claim 30, the WLAN positioning system using public and private WLAN access points that are deployed over a metropolitan area.

* * * * *